Patented Feb. 26, 1946

2,395,505

UNITED STATES PATENT OFFICE 2,395,505

VULCANIZATION OF SYNTHETIC RUBBER

Donald V. Sarbach, Cuyahoga Falls, Ohio, assignor to The B. F. Goodrich Company, New York, N. Y., a corporation of New York No Drawing. Application May 24, 1943,
Serial No. 488,212

18 Claims. (Cl. 260—84.5)

This invention relates to the vulcanization or curing of synthetic rubber of the type which may be defined as rubbery copolymers of butadiene-1,3 hydrocarbons with copolymerizable mono-olefinic compounds, and has as its principal object to provide a new class of vulcanizing agents by the use of which such synthetic rubber may be cured efficiently and economically and improved vulcanizates obtained, without the use of sulfur and other conventional sulfur-containing vulcanizing agents.

The vulcanization or curing, i. e., the conversion from an essentially plastic condition to an essentially elastic, non-plastic condition, of rubbery copolymers of butadiene-1,3 hydrocarbons with copolymerizable mono-olefinic compounds has heretofore been effected by heating the copolymer with about 1 to 10% of sulfur in much the same manner that natural crude rubber is vulcanized. Furthermore, it has heretofore been believed that the presence of sulfur or some other conventional sulfur-containing vulcanizing agent such as sulfur monochloride, sulfur dithiocyanate, tetraalkyl thiuram sulfides or the like was absolutely necessary for the vulcanization of this type of synthetic rubber.

While this method of vulcanization has been more or less satisfactory, there are many instances, particularly when the synthetic rubber to be vulcanized is in the form of a liquid composition such as a solution or cement, where it is desirable to effect a cure at lower temperatures and in a shorter time than is possible with the known vulcanizing technique. For example, it has not been possible to air cure cements containing this type of synthetic rubber at room temperature in a few hours except by the combined use of sulfur and ultra-rapid accelerators of vulcanization. It has also been difficult to effect a rapid cure of synthetic rubber compositions of the type used in tires, tubes, molded goods and the like when sulfur is the vulcanizing agent; and even when ultra-rapid accelerators of vulcanization are used in connection with the sulfur, satisfactory cures are not always obtained since undesirable scorching of the vulcanizate frequently occurs.

I have now discovered that rubbery copolymers of butadiene-1,3 hydrocarbons and copolymerizable mono-olefinic compounds may be rapidly vulcanized, even in the absence of sulfur and other conventional vulcanizing agents, by the use of one or more members of the class consisting of aliphatic polyamines and hydroxy-substituted polyamines as the vulcanizing agents. Such amines may be incorporated in solid or liquid compositions comprising such synthetic rubber and the compositions then vulcanized. They may be added to solutions and cements of such synthetic rubber to produce compositions which will air cure in a few hours at room temperature, and they may otherwise be used to replace or to supplement the conventional vulcanizing agents, their use as the sole vulcanizing agent being preferred.

The aliphatic polyamine employed may be any open-chained organic compound composed of carbon, hydrogen and nitrogen in which the nitrogen is present in amine groups, of which there are at least two, and which may be either primary ($-NH_2$), secondary $$(-\overset{H}{\underset{}{N}}-)$$

or tertiary $$(-\overset{|}{\underset{}{N}}-)$$

amine groups; the said amine groups being attached to carbon atoms present in alkylene groups, that is, bivalent open-chain aliphatic groups having the two free valences attached to different carbon atoms. The term aliphatic polyamine as used herein will be understood to have the foregoing meaning. Any hydroxy-substituted polyamine, i. e., an aliphatic polyamine having one or more hydroxy groups attached to carbon atoms, may also be employed.

The preferred compounds of the class consisting of aliphatic polyamines and hydroxy-substituted aliphatic polyamines for use as vulcanizing agents in this invention are the alkylene polyamines including the alkylene diamines such as ethylene diamine (1,2-diamino ethane), 1,2-diamino propane, 1,3-diamino propane, 1,2,3-triamino propane, 1,4-diamino butane, hexamethylene diamine, 1,8-diamino octane, 1,10-diamino decane and the like and the polyalkylene polyamines such as diethylene triamine, tetraethylene pentamine, triethylene tetramine, pentaethylene hexamine, diethylene tetramine, dipropylene triamine, tetrabutylene pentamine, triamino triethyl amines and the like; the hydrocarbon substituted alkylene polyamines including amines in which the hydrocarbon substituent is attached either to nitrogen or to an aliphatic carbon atom such as dibutyl ethylene diamine, phenyl triethylene tetramine, triethyl diethylene triamine, 2-amino triethyl amine, 1,2-di-(ethyl amino) ethane, 1,2-di-(dimethyl amino) ethane, 1,3-di-(methyl amino) propane and the like; and the hydroxy-substituted alkylene polyamines in which the hydroxy group is attached to aliphatic carbon atoms such as 1,2-diamino ethanol, 1,3-di-(diethyl amino) propanol, 1,3-diamino propanol and the like. All these aliphatic polyamines and hydroxy-substituted aliphatic polyamines may be represented by the structural formula

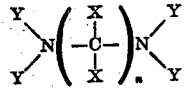

wherein Y is hydrogen, a hydrocarbon group or a hydroxy or amino substituted hydrocarbon group; X is hydrogen, hydroxy, a hydrocarbon group or a hydroxy or amino substituted hydrocarbon group and $n$ is an integer, preferably greater than 1.

The polyalkylene polyamines of the formula

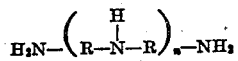

wherein R is an alkylene group and $n$ is an integer from 1 to 5 are particularly preferred polyamines for use in this invention. Another particularly preferred sub-class of aliphatic polyamines are the alkylene diamines of the formula $H_2N—(CH_2)_n—NH_2$ wherein $n$ is an integer from 1 to 10. The use of the polyalkylene polyamines as vulcanizing agents is more particularly disclosed and claimed in the copending application of Doran E. Sauser, Serial No. 488,211, filed concurrently herewith on May 24, 1943.

In the practice of the invention one or more of the above-mentioned polyamines is associated with an unvulcanized rubbery copolymer of a butadiene-1,3 hydrocarbon and a copolymerizable mono-olefinic compound, and the composition is then vulcanized. The polyamines may be incorporated in the rubbery copolymer while the latter is being worked on a roll mill or masticated in an internal mixer and they may be added alone, in admixture with each other or with other compounding ingredients such as pigments, antioxidants, softeners or other vulcanizing agents and vulcanization accelerators, or in the form of a masterbatch. When the rubbery copolymer is in the form of a cement or dispersed in water or a solvent, the polyamines may simply be dissolved or dispersed therein. The vulcanization of the synthetic rubber composition containing the polyamine vulcanizing agent may be effected in a heated mold, in open steam, in hot air or, in the event the composition is a solution or a cement, simply by allowing the composition to air cure at room temperature. The conditions required for vulcanization such as time and temperature will obviously be dependent on the nature of the particular composition to be vulcanized and are not critical.

The proportions of the polyamine vulcanizing agent to be used may be varied within wide limits. The use of from 0.5 to 5% or even 10% based on the weight of the synthetic rubber is ordinarily preferred although greater or smaller amounts may desirably be employed in some instances.

Any of the rubbery copolymers of one or more butadiene-1,3 hydrocarbons such as butadiene-1,3, isoprene, 2,3-dimethyl butadiene-1,3, piperylene or the like, with one or more copolymerizable mono-olefinic compounds may be vulcanized by the method of this invention. Copolymerizable mono-olefinic compounds are organic compounds which contain a single olefinic double bond

and which are copolymerizable with butadiene-1,3 hydrocarbons. Such compounds are usually low molecular weight compounds of less than 10 carbon atoms which contain at least two hydrogen atoms and at least one radical other than hydrogen attached to the doubly bound carbon atoms, as in the structure

where at least one of the disconnected valences is attached to a group other than hydrogen and more electronegative than hydrogen such as chlorine, alkyl, alkoxy, acyl or, as is more often the case, a group containing an unsaturated bond other than an olefinic double bond conjugated with the double bond in the

group such as an aryl group, a $$-\underset{\underset{O}{\|}}{C}-$$

group or a $C\equiv N$ group. Examples of such compounds include styrene, p-methyl styrene, alpha-methyl styrene, p-chloro styrene, vinyl naphthalene and similar aryl olefins and substituted aryl olefins; isobutylene and similar copolymerizable olefinic hydrocarbons; acrylic and substituted acrylic acids and their esters, nitriles and amides such as acrylic acid, acrylonitrile, methacrylonitrile, alpha-chloro acrylonitrile, methyl acrylate, methyl methacrylate, ethyl methacrylate, methyl alpha-chloro acrylate, acrylamide, methacrylamide and the like; vinyl methyl ketone, vinyl methyl ether, vinylidene chloride and similar copolymerizable compounds containing a single olefinic double bond. Although rubbery copolymers prepared by the copolymerization by any desired method of a butadiene-1,3 hydrocarbon and a copolymerizable mono-olefinic compound in any desired proportions (providing a rubbery material is the product) may be used, the rubbery copolymers which are ordinarily employed in this invention are those prepared by the copolymerization in aqueous emulsion of butadiene-1,3 with a lesser amount of styrene, acrylonitrile or an acrylic ester or by the copolymerization of butadiene-1,3 and iso-butylene. Such copolymers are known commercially under such names as "Ameripol," "Hycar," "Perbunan," "Buna S," "GR—S," "Chemigum," "Butyl," "Flexon," etc.

In order to illustrate the use of aliphatic polyamines in the vulcanization of such synthetic rubbers the following examples are set forth:

*Example I*

A rapid air-curing synthetic rubber cement useful as a coating composition, as an adhesive, and for various other purposes is prepared from a synthetic rubber composition made up of the following ingredients:

| | Parts |
|---|---|
| A rubbery copolymer prepared by the copolymerization in aqueous emulsion of butadiene-1,3 and a lesser amount of acrylonitrile | 100 |
| Gastex carbon black | 100 |
| Stearic acid | 1 |
| Tricresyl phosphate | 20 |

The above composition is dissolved in a volatile organic solvent therefor such as benzene, toluene, chlorobenzene, acetone, methyl ethyl ketone, ethyl acetate, ethylene dichloride, nitroethane or the like or a mixture of these to form a 10% by volume cement; and 10 parts of ethylene diamine either as such or dissolved in a solvent is added thereto. When the cement is then spread on a fabric base or applied to an adhesive joint or otherwise applied in the manner in which it is to be used, and is allowed to stand for about 24 hours at room temperature or is heated for 1 hr. at 158° F., the film deposited from the cement is found to be well vulcanized, strong and elastic and tightly adhered to the base. When the polyamine is not added to the cement, but the conventional curing ingredients such as sulfur and vulcanization accelerators are added thereto instead, the cement does not cure at room temperature until several days or weeks and even when heated to 158° F. several hours are necessary for vulcanization. Moreover when a cement containing sulfur and a vulcanization accelerator is similarly treated with ethylene diamine, the time required for vulcanization of the cement is remarkably shortened. Ethylene diamine thus acts both as a vulcanizing agent for vulcanizations without sulfur and as a vulcanization accelerator for vulcanizations with sulfur.

As illustrated in the foregoing example it is generally preferred not to add the aliphatic polyamine to the synthetic rubber cement until immediately or soon before the cement is to be used since the amine rapidly "sets up" or cures the cement into an irreversible gel. However, if it is desired to produce a gel to be used as such or to increase the viscosity of dilute solutions of synthetic rubber, this may be accomplished by addition of the polyamine either to the synthetic rubber composition before it is dissolved or to a solution thereof. The following example illustrates the preparation of an irreversible gel containing minimum amounts of synthetic rubber and maximum amounts of solvent.

*Example II*

A rubbery butadiene-1,3 styrene copolymer is dissolved in gasoline (or some other suitable solvent such as those mentioned in Example I) to form a 1 to 4% by volume solution. There is then added to this dilute solution 5% by weight based on the synthetic rubber of ethylene diamine or some other aliphatic polyamine or hydroxy substituted aliphatic polyamine. Upon addition of the amine to the solution the solution begins to "set up" or cure and after a few hours an irreversible gel is formed. This "setting up" or curing may be accelerated by the application of heat if desired. Substituting the polyamines with sulfur, sulfur dichloride, carbon disulfide or with sulfur and an ultra vulcanization accelerator such as the zimates, "Butyl 8," "C.P.B." or the like does not produce a gel from such a dilute synthetic rubber solution.

In addition to the use of aliphatic polyamines as vulcanizing agents for synthetic rubber cements, the present invention also contemplates the use of such polyamines as vulcanizing agents for any other type of synthetic rubber composition such as synthetic rubber latices for the manufacture of dipped goods and synthetic rubber compositions of the type used in the manufacture of tires, tubes, belting, hose, bullet-sealing gasoline tanks and the like. The following example will illustrate the use of ethylene diamine in compositions suitable for use in tires, tubes and molded goods.

*Example III*

The following ingredients are mixed on a two roll mixing mill:

| | Parts |
|---|---|
| Rubbery butadiene-1,3 acrylonitrile copolymer | 100 |
| Channel black | 45 |
| Pine tar | 3 |
| Coal tar | 4 |
| Stearic acid | 2.5 |
| Phenyl-beta naphthylamine | 0.6 |
| Ethylene diamine | 3.0 |

The resulting composition is then vulcanized in a press for 45 minutes at 280° F., whereupon an excellent vulcanizate is obtained. It is to be noted that none of the conventional rubber vulcanizing agents is present in the composition, the ethylene diamine being solely responsible for the vulcanization. When sulfur is also included in the composition a fast-curing but non-scorching stock is obtained.

Although the invention has been illustrated by the foregoing examples it is to be understood that the invention is not limited thereto and that numerous variations and modifications which will be obvious to those skilled in the art are within the spirit and scope of the invention as defined by the appended claims.

I claim:

1. The method which comprises vulcanizing a rubbery copolymer of a butadiene-1,3 hydrocarbon and a copolymerizable mono-olefinic compound in the presence of a member of the class consisting of aliphatic polyamines composed exclusively of carbon, hydrogen and amine nitrogen atoms and hydroxy-substituted aliphatic polyamines having hydroxy attached to carbon and being otherwise composed exclusively of carbon, hydrogen and amine nitrogen atoms, and in the absence of sulfur and other sulfur-containing vulcanizing agents.

2. The method which comprises vulcanizing a rubbery copolymer of butadiene-1,3 and a copolymerizable mono-olefinic compound in the presence of a member of the class consisting of aliphatic polyamines composed exclusively of carbon, hydrogen and amine nitrogen atoms and hydroxy-substituted aliphatic polyamines having hydroxy attached to carbon and being otherwise composed exclusively of carbon, hydrogen and amine nitrogen atoms, and in the absence of sulfur and other sulfur-containing vulcanizing agents.

3. The method which comprises vulcanizing a rubbery copolymer of butadiene-1,3 and a copolymerizable mono-olefinic compound in the presence of an aliphatic polyamine composed exclusively of carbon, hydrogen and amine nitrogen atoms and in the absence of sulfur and other sulfur-containing vulcanizing agents.

4. The method which comprises vulcanizing a rubbery copolymer of butadiene-1,3 and a copolymerizable mono-olefinic compound in the presence of ethylene diamine and in the absence of sulfur and other sulfur-containing vulcanizing agents.

5. The method which comprises vulcanizing a rubbery copolymer of butadiene-1,3 and a copolymerizable mono-olefinic compound in the presence of an alkylene diamine in which the alkylene group is composed exclusively of carbon and hydrogen atoms, and in the absence of sulfur and other sulfur-containing vulcanizing agents.

6. The method which comprises vulcanizing a rubbery copolymer of butadiene-1,3 and styrene in the presence of a member of the class consisting of aliphatic polyamines composed exclusively of carbon, hydrogen and amine nitrogen atoms and hydroxy-substituted aliphatic polyamines having hydroxy attached to carbon and being otherwise composed exclusively of carbon, hydrogen and amine nitrogen atoms, and in the absence of sulfur and other sulfur-containing vulcanizing agents.

7. The method which comprises vulcanizing a rubbery copolymer of butadiene-1,3 and styrene in the presence of an alkylene diamine in which the alkylene group is composed exclusively of carbon and hydrogen atoms, and in the absence of sulfur and other sulfur-containing vulcanizing agents.

8. The method which comprises vulcanizing a rubbery copolymer of butadiene-1,3 and styrene in the presence of ethylene diamine and in the absence of sulfur and other sulfur-containing vulcanizing agents.

9. The method which comprises vulcanizing a rubbery copolymer of butadiene-1,3 and acrylonitrile in the presence of a member of the class consisting of aliphatic polyamines composed exclusively of carbon, hydrogen and amine nitrogen atoms and hydroxy-substituted aliphatic polyamines having hydroxy attached to carbon and being otherwise composed exclusively of carbon, hydrogen and amine nitrogen atoms, and in the absence of sulfur and other sulfur-containing vulcanizing agents.

10. The method which comprises vulcanizing a rubbery copolymer of butadiene-1,3 and acrylonitrile in the presence of ethylene diamine and in the absence of sulfur and other sulfur-containing vulcanizing agents.

11. A synthetic rubber composition comprising a rubbery copolymer of butadiene-1,3 and a copolymerizable mono-olefinic compound and, as the sole vulcanizing agent therefor, a member of the class consisting of aliphatic polyamines composed exclusively of carbon, hydrogen and amine nitrogen atoms and hydroxy-substituted aliphatic polyamines having hydroxy attached to carbon and being otherwise composed exclusively of carbon, hydrogen and amine nitrogen atoms.

12. A synthetic rubber composition comprising a rubbery copolymer of butadiene-1,3 and styrene and, as the sole vulcanizing agent therefor, a member of the class consisting of aliphatic polyamines composed exclusively of carbon, hydrogen and amine nitrogen atoms and hydroxy-substituted aliphatic polyamines having hydroxy attached to carbon and being otherwise composed exclusively of carbon, hydrogen and amine nitrogen atoms.

13. A synthetic rubber composition comprising a rubbery copolymer of butadiene-1,3 and acrylonitrile and, as the sole vulcanizing agent therefor, a member of the class consisting of aliphatic polyamines composed exclusively of carbon, hydrogen and amine nitrogen atoms and hydroxy-substituted aliphatic polyamines having hydroxy attached to carbon and being otherwise composed exclusively of carbon, hydrogen and amine nitrogen atoms.

14. An air-curing synthetic rubber cement comprising a rubbery copolymer of butadiene-1,3 and acrylonitrile, a volatile organic solvent therefor and as the sole vulcanizing agent, an alkylene diamine in which the alkylene group is composed exclusively of carbon and hydrogen atoms.

15. A vulcanizate prepared by the method of claim 1.

16. A vulcanizate prepared by the method of claim 4.

17. A vulcanizate prepared by the method of claim 6.

18. A vulcanizate prepared by the method of claim 9.

DONALD V. SARBACH.